United States Patent [19]

Blumenberg

[11] 4,369,911
[45] Jan. 25, 1983

[54] METHOD OF MAKING A GAS-TIGHT CONNECTION BETWEEN A CORRUGATED HIGH QUALITY TUBE AND A HIGH QUALITY STEEL SLEEVE

[75] Inventor: Guenther Blumenberg, Hanover-Doehren, Fed. Rep. of Germany

[73] Assignee: Kabel-und Metallwerke Gutehoffnungshuette AG, Hanover, Fed. Rep. of Germany

[21] Appl. No.: 164,920

[22] Filed: Jul. 1, 1980

[30] Foreign Application Priority Data

Jan. 18, 1980 [DE] Fed. Rep. of Germany ....... 3001666

[51] Int. Cl.³ .......................... B23K 9/02; B23K 5/02
[52] U.S. Cl. .............................. 228/173 F; 29/157 R; 29/456; 72/316; 285/286
[58] Field of Search .............. 228/136, 173 F; 72/316, 72/317; 29/157 R, 456; 285/286, 334.5, 382.4, 405

[56] References Cited

U.S. PATENT DOCUMENTS

| 409,641 | 8/1889 | Jeffrey | 29/157 R X |
| 4,211,103 | 7/1980 | Grimaldo | 72/316 |
| 4,227,639 | 10/1980 | Blumenberg | 228/173 F |
| 4,285,115 | 8/1981 | Frenzel | 228/173 F X |

FOREIGN PATENT DOCUMENTS 2724311 12/1978 Fed. Rep. of Germany ... 228/173 F

Primary Examiner—Joseph H. McGlynn
Assistant Examiner—Fred A. Silverberg
Attorney, Agent, or Firm—Martin A. Farber

[57] ABSTRACT

A gas-tight connection is achieved by fusion bonding a flanged end portion of a thin walled, corrugated metallic tube onto a flanged interior surface of a metallic sleeve whose interior surface includes helical threads that correspond to the helical corrugations on the outer surface of the metallic tube. The method disclosed comprises screwing the sleeve onto the tube to a position and orientation whereat the flanged interior surface of the sleeve faces, but is longitudinally separated from, the end portion of the tube to which it is to be bonded. The end portion of the tube is then decorrugated and expanded; a clamping tool is coaxially positioned about such end portion of the tube, a forming mandrel is axially positioned within such end portion, and the clamping tool is tightly closed so as to flange such end portion in a manner to parallel the flanged interior surface of the sleeve. The clamping tool and forming mandrel are removed and the sleeve is screwed toward the end portion of the tube so that such parallel flanged elements engage each other. The thin walled tube is then fusion welded onto the flanged interior surface of the sleeve, by the application of a welding arc or flame to the interior surface of the flanged end portion of the tube, the sleeve in of itself acting as a heat sink.

6 Claims, 4 Drawing Figures

U.S. Patent  Jan. 25, 1983  4,369,911
FIG. 1
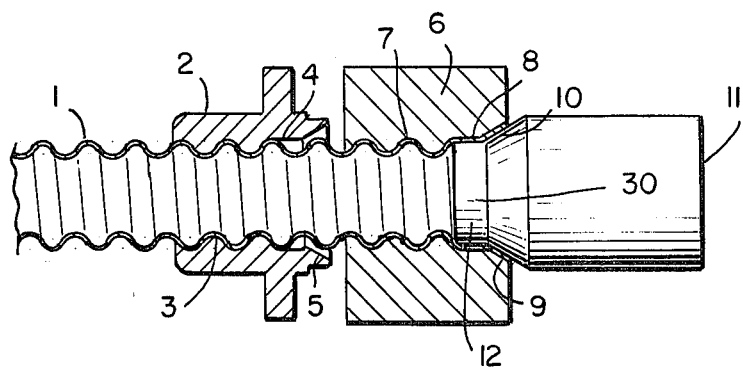
FIG. 2
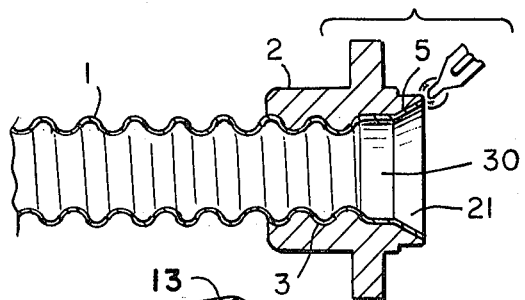
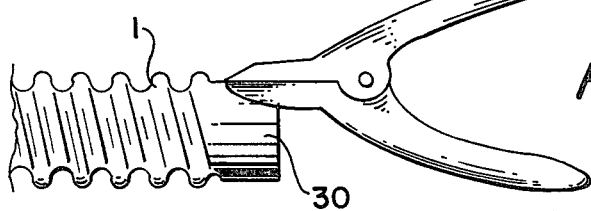
FIG. 4
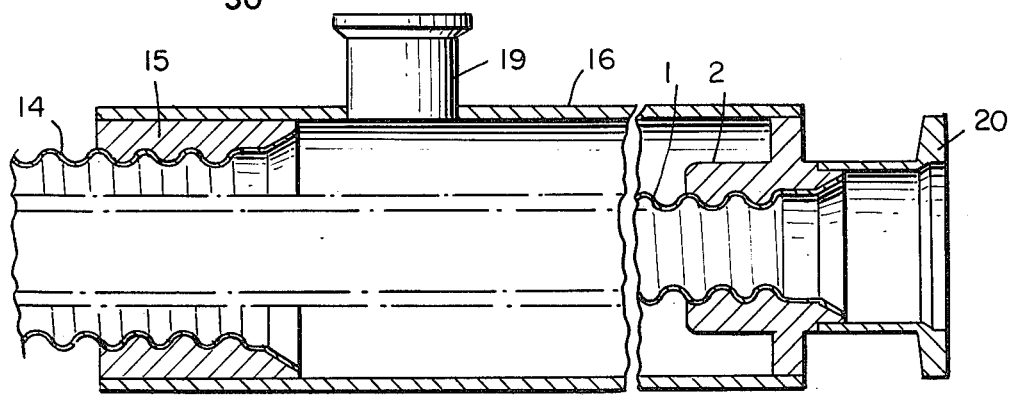
FIG. 3

METHOD OF MAKING A GAS-TIGHT CONNECTION BETWEEN A CORRUGATED HIGH QUALITY TUBE AND A HIGH QUALITY STEEL SLEEVE

The present invention relates to an improved method for making a gas-tight connection between an end portion of a thin walled, corrugated metallic tube and a metallic sleeve.

Exemplary of the priorly known manner of providing a gas-tight connection between a thin walled, corrugated metallic tube and a metallic sleeve, is the method disclosed in German laid open Pat. No. 2,724,311. In accordance with such disclosure, the corrugations of an end portion of a metallic tube are removed, and an internally threaded metallic sleeve is screwed onto the tube. The sleeve employed in accordance with such method includes a thin walled extension which is first longitudinally aligned with the decorrugated end portion of the tube and then brought into intimate contact with such end portion. The tube extension is then fusion bonded onto the decorrugated end portion of the tube. Placing the thin walled sleeve extension into intimate contact with the decorrugated end portion of the tube is achieved either by radially expanding such end portion of the tube or forcing the sleeve extension down onto such decorrugated end portion of the tube. A metallic ring is positioned within the decorrugated end portion of the tube for supporting the thin wall of such end portion, and to act as a heat sink upon the application of a welding arc or flame to the outer surface of the sleeve extension. Direct contact of the arc or flame with any part of the thin walled tube is purposely avoided so as to minimize the risk of burning holes in the thin tube.

It is an object of the present invention to provide a technically superior and more economic method of forming a gas-tight connection between an end portion of a thin walled, corrugated metallic tube and a metallic sleeve, and in particular, providing such connection by fusion bonding a flanged end portion of such tube onto a flanged interior surface of such sleeve.

In accordance with the teachings of the instant invention, the object of the invention is achieved with the employment of a metallic sleeve having an interior surface including helical threads that correspond to the helical corrugations of the outer surface of a thin walled, corrugated metallic tube, and an interior surface segment flanged radially 15° to 45°, preferably 30°, with respect to the longitudinal axis of the sleeve. The sleeve is screwed onto the tube to a position and orientation whereat the flanged interior surface of the sleeve faces, but is longitudinally separated from, the end portion of the tube to which it is to be bonded. The end portion of the tube is then decorrugated and expanded; a clamping tool is coaxially positioned about such end portion of the tube, a forming mandrel is axially positioned within such end portion, and the clamping tool is tightly closed so as to flange such end portion in a manner to parallel the flanged interior surface of the sleeve. The clamping tool and forming mandrel are removed and the sleeve is screwed toward the end portion of the tube so that such parallel flanged elements engage each other. The thin walled tube is then fusion welded onto the flanged interior surface of the sleeve, by the application of a welding arc or flame to the interior surface of the flanged end portion of the tube, the sleeve in of itself acting as a heat sink.

The method of the present invention has been found to provide a superior gas-tight connection between the flanged end portion of the thin walled, metallic tube and the flanged interior surface of the metallic sleeve, since the stresses experienced in forming the flanged end portion of the thin walled tube are not so excessive as to result in metal fracture in the tube, while the parallel flanged interior surfaces of the sleeve and the tube (i) provide a continuous circumferential area of contact for improved fusion bonding thereat, and (ii) provide convenient accessibility for the application of a welding torch to the interior surface of such flanged end portion of the tube.

Another aspect of the present invention involves the provision of an internal recess in the interior surface of the sleeve between the helical threads and the outwardly flanged interior surface. Preferably, such recess has a circular cross-section which limits the heat conductance away from the flanged interior surface, thus controlling the concentration of heat energy in the vicinity of the contiguous flanged surfaces for greater efficacy of the fusion welding.

The invention will be more clearly understood by reference to the following detailed description of exemplary embodiments thereof in conjunction with the accompanying drawing in which:

FIG. 1 is a sectional view of one end of a thin walled, corrugated metallic tube, a metallic sleeve which has been initially screwed onto the tube to a position longitudinally separated from the end portion of the tube to which it is to be bonded; and a clamping tool coaxially positioned about the end portion of the tube and a forming mandrel axially positioned within such end portion, for performing the flanging step of the end portion of the tube in accordance with the method of the instant invention.

FIG. 2 is a sectional view of the metallic tube and metallic sleeve of FIG. 1 after the end portion of the tube has been flanged, the clamping tool and forming mandrel of FIG. 1 having been removed, and the metallic sleeve having been screwed toward and into engagement with such flanged end portion of the tube.

FIG. 3 illustrates a cryogenic transmission system assemblage of metallic tubes and metallic sleeves having gas-tight connections therebetween provided in accordance with the method of the instant invention.

FIG. 4 shows the metallic sleeve being decorrugated and expanded.

With reference to FIG. 1, there is depicted a thin walled, corrugated metallic tube 1 of high quality steel having an inner diameter of 14 mm and a wall thickness of 0.3 mm. A metallic sleeve 2, also comprised of high quality steel, is screwed coaxially about the metallic tube 1 to a position longitudinally separated from an open end portion 30 of the metallic tube 1 to which the sleeve is to be fusion bonded. The metallic sleeve 2 includes an internal aperture comprising: an internal threaded segment 3, the threading of which corresponds to the helical corrugations of the metallic tube 1; a recessed section 4 having a circular cross-section; and an interior end surface 5 flanged outwardly 30° being frustoconical.

Upon the positioning of the metallic sleeve 2 as illustrated in FIG. 1, the open end portion 30 of the tube 1 is decorrugated and expanded by means of pliers 13 (FIG. 4). Preferably, the jaws of the pliers have a curvature whereby the expanded open end portion 30 of the metallic tube 1 corresponds to the maximum inner radius of the corrugations of the metallic tube 1. Thereafter, a clamping tool 6, which includes an internal aperture comprising a course internal thread section 7, a cylindrical surface portion 8 and an interior end surface 9 flanged outwardly 30°, is coaxially positioned about the metallic tube 1 in partial alignment with the expanded open end portion 30 of metallic tube 1. Additionally, a forming mandrel 11 having a cylindrically shaped end portion 12 and a flanged portion 10, is axially positioned so as to partially reside within the expanded end portion 30 of the metallic tube 1. Upon the clamping tool 6 being tightly closed, the expanded open end portion 30 of the metallic tube 1 is frustoconically flanged to an angle of 30° over its complete circumference in the area aligned with the interior end surface 9 and the flanged portion 10 of the clamping tool 6 and forming mandrel 11.

FIG. 2 illustrates the condition after the open end portion 30 has been flanged, the clamping tool 6 and forming mandrel 11 have been removed, and the metallic sleeve 2 has been screwed toward the right, into engagement with the flanged open end portion 30 of the metallic tube 1. An internal circumferential surface 21 of the flanged, open end portion 30 of the metallic tube 1 is readily accessible for the application of a welding arc or flame for fusion welding the outer surface of such portion onto the interior end surface 5 of the metallic sleeve 2, with the sleeve itself acting as a firm support for the thin walled tube and as a heat sink in the welding procedure.

With reference to FIG. 3, there is illustrated a cryogenic transmission system assemblage 22 comprising a metallic tube 1 having a metallic sleeve 2 fusion bonded to an open end thereof in accordance with the procedures described above in association with FIGS. 1 and 2. Included in the assemblage 22 is a metallic tube 14 having a metallic sleeve 15 fusion bonded to an open end thereof, in accordance with the aforesaid procedures. An encompassing, cylindrical metallic pipe 16 is coaxially positioned about and welded to each of the metallic sleeves 15 and 2. The metallic pipe 16 is provided with a valve device 19 which communicates with the annular volume between the metallic tube 1 and the metallic pipe 16 between the longidudinal positions of the metallic sleeves 15 and 2. As illustrated in FIG. 3, the metallic tube 1 is partially positioned within the metallic tube 14, passing axially through the metallic sleeve 15. The valve device 19 is employed to evacuate the annular volume between metallic tube 1 and metallic pipe 16, while the annular space between the coaxially positioned metallic tube 1 and the encompassing metallic tube 14 is employed as an insulating casing. A flanged input device 20 is fusion welded to the metallic sleeve 2 as a simplified output for a cryogenic media that is transmitted through the exemplary assemblage.

Numerous modifications and variations of the present invention are possible in light of the above teachings, and therefore, within the scope of the appended claims, the invention may be practiced otherwise than as particularly described.

I claim:

1. A method of making a gas-tight connection between an open end portion of a thin walled corrugated, high quality metallic tube and a metallic sleeve whose interior surface includes helical threads that correspond to the helical corrugations on the outer surface of the metallic tube, comprising the steps of:

screwing the sleeve onto the tube to a position and orientation such that a flanged interior surface of the sleeve, flanged radially at an angle of 15–45 degrees, faces, but is longitudinally separated from, the open end portion of the tube to which the sleeve is to be bonded;

decorrugating and expanding the open end portion of the tube;

flanging the decorrugated and expanded open end portion of the tube at an angle of 15–45 degrees in a manner so as to be parallel to the flanged interior surface of the sleeve;

screwing the sleeve on the tube toward the open end portion of the metallic tube until the parallel flanged interior surface of the sleeve and the outer surface of the tube at its flanged open end portion engage each other in an area of circumferential contact; and fusion welding the tube onto the sleeve in the area of circumferential contact, by welding along the circumference of the interior surface of the flanged end portion of the tube opposite the area of circumferential contact.

2. Method in accordance with claim 1, wherein the metallic sleeve is provided with a recessed section in its interior surface between the helical threads and the flanged interior surface, said recessed section having a circular cross section which limits the heat conductance away from the flanged interior surface of the sleeve.

3. The method as set forth in claim 2, wherein
in said decorrugating and expanding and flanging steps said tube is formed with a cylindrical portion between the helical corrugations and the flanged end portion of the tube having a radius which corresponds to that of said circular cross section of the recessed section of the sleeve.

4. The method as set forth in claim 2, wherein
in said decorrugating and expanding and flanging steps said tube is formed with a cylindrical portion between the helical corrugations and the flanged end portion of the tube having a radius which corresponds to the maximum inner radius of the corrugations of the metallic tube and to that of said circular cross section of the recessed section of the sleeve.

5. The method as set forth in claim 1, wherein
said flanged interior surface of the sleeve and the flanged end portion of the tube are formed frustoconically.

6. A method of making a gas-tight connection between an open end portion of a corrugated, metallic tube and a metallic sleeve whose interior surface includes helical threads that correspond to the helical corrugations on the outer surface of the metallic tube, comprising the steps of:

screwing the sleeve onto the tube to a position and orientation whereat a flanged interior surface of the sleeve faces, but is longitudinally separated from, the open end portion of the tube to which it is to be bonded;

decorrugating and expanding the open end portion of the tube;

flanging the decorrugated and expanded open end portion of the tube in a manner to parallel the flanged interior surface of the sleeve;

screwing the sleeve toward the open end portion of the metallic tube until the parallel flanged interior surface of the sleeve and the flanged exterior surface of the tube engage each other in an area of circumferential contact; and fusion welding the tube onto the sleeve in the area of circumferential contact, by the application of a welding arc or flame along the circumference of the interior surface of the flanged end portion of the tube opposite the area of circumferential contact, the flanging step of the decorrugated and expanded open end of the tube comprises:

coaxially positioning a clamping tool about said end portion of the tube, said clamping tool including an internal aperture comprising an internal threaded section and an interior end surface flanged outwardly at an angle corresponding to the flanged interior surface of the sleeve;

axially positioning a forming mandrel having a flanged exterior surface partially within said expanded end portion of said tube; and tightly closing said clamping tool so as to flange said open end portion of the tube over its complete circumference in the area aligned between the respective flanged surfaces of the clamping tool and the forming mandrel.

* * * * *